Figures 1, 2:
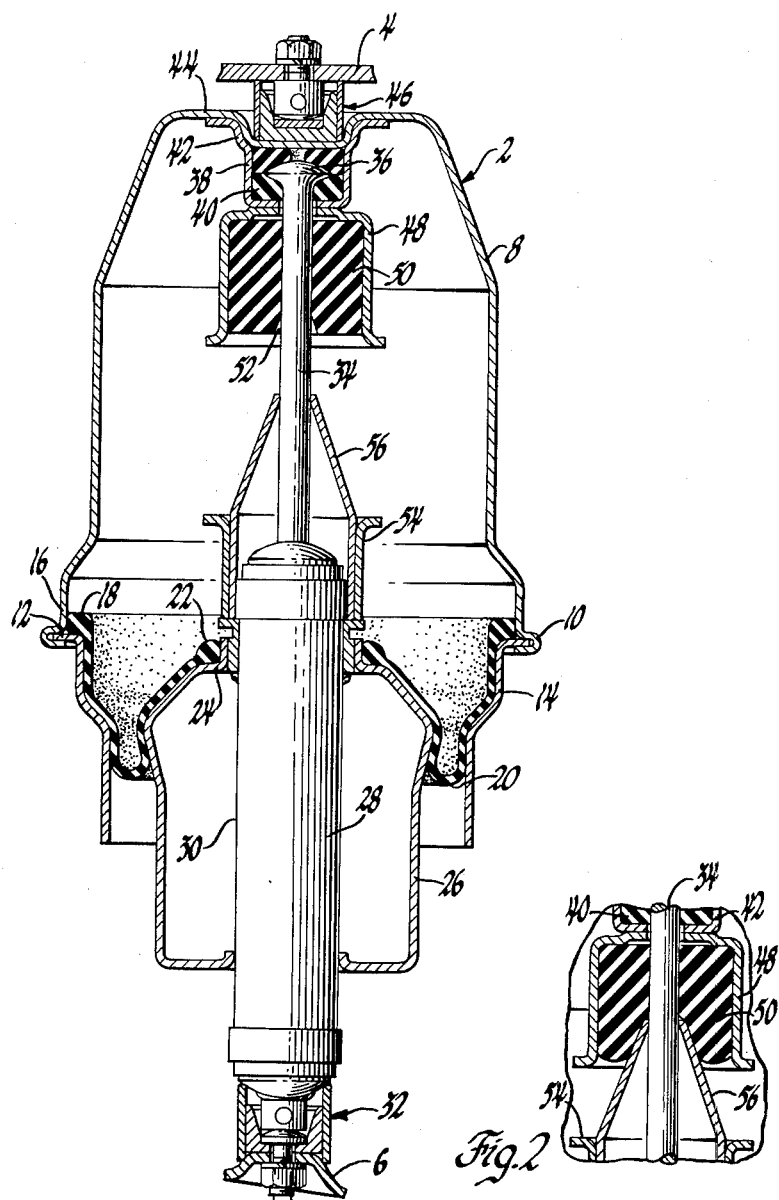

July 24, 1962 VON D. POLHEMUS ET AL 3,046,000
VEHICLE SUSPENSION SPRING ASSEMBLY
Filed Jan. 15, 1960

INVENTORS
Von D. Polhemus &
BY Ming-Chih Yew

W. F. Wagner
ATTORNEY

United States Patent Office 3,046,000
Patented July 24, 1962

3,046,000
VEHICLE SUSPENSION SPRING ASSEMBLY
Von D. Polhemus, Franklin, and Ming-Chih Yew, Utica, Mich., assignors to General Motors Corporation, Detroit, Mich., a corporation of Delaware
Filed Jan. 15, 1960, Ser. No. 2,784
1 Claim. (Cl. 267—64)

This invention relates to vehicle suspension spring assemblies and more particularly to spring assemblies incorporating deflection stops.

In conventional vehicle suspenson, it is customary to incorporate bumpers in the form of rubber blocks which act to arrest deflection of the sprung and unsprung mass before the load supporting spring reaches either maximum compression or rebound deflection position, and thereby avoids metal-to-metal contact when the suspension is subjected to momentary excessive load or absence of load. In the past, such bumpers have usually taken the form of a bullet-nosed body of rubber which is arranged so as to be abuttingly engaged upon occurrence of the excessive suspension deflection described. While such devices have performed satisfactorily, experience has shown that where a suspension is subjected to repeated excessive deflection, the rubber bumper tends to fracture or shred. In addition, with the typical bumper, there is a pronounced and abrupt change in the effective spring rate of the suspension upon initial engagement with the rubber bumper. This characteristic has been found to be particularly noticeable in air suspended vehicles.

An object of the present invention is to provide an improved spring assembly for vehicle suspension.

A further object is to provide in a spring assembly of the type having a concentrically arranged telescoping shock absorber, elastic bumper means formed and arranged so that upon impact thereof, spring rate transition is virtually imperceptible.

Another object is to provide an air spring assembly including bump stop means providing a gradual and smooth change of rate blending with the normal progressive rate change of the air spring.

Still a further object is to provide an arrangement of the stated character wherein the bump stop coacts with a conical striker carried by the hydraulic shock absorber casing.

Yet a further object is to provide an improved and simplified air spring assembly which includes an integrated hydraulic shock absorber and compression bump stop.

These and other objects, advantages, and features of the invention will become more fully apparent as reference is had to the accompanying specification and drawing wherein:

FIG. 1 is a side elevational view, partly in section, illustrating a suspension spring assembly in accordance with the invention, the parts being shown in the relationship existing when the spring assembly is in the normal load supporting position; and FIG. 2 is a fragmentary sectional elevational view of a portion of the spring assembly of FIG. 1, showing the relative arrangement of certain coacting parts when the spring assembly is in a compression deflection position approaching maximum bump.

Referring now to the drawings and particularly FIG. 1, there is shown a spring assembly 2 which is adapted for disposition between the sprung mass 4 and unsprung mass 6 of a vehicle, not shown. It will be understood that the construction shown may be utilized either in front or rear suspension of a vehicle and is not limited to any particular structural or geometric arrangement thereof. As seen in the drawing, spring assembly 2 includes an inverted cup-shaped spring dome 8, the lower open end of which is formed with a radially outwardly flared circumferential flange 10 which is crimped inwardly to engage a flange 12 formed at the upper end of a depending annular skirt 14. Flange 12 cooperates with the lower peripheral wall 16 of dome 8 to form a shoulder for the outer circular bead portion 18 of a flexible diaphragm element 20. Diaphragm 20 is of the rolling lobe type and has an inner circular bead portion 22 which seats on a shoulder portion 24 formed on the upper end of a hollow piston 26. Piston 26 in turn is rigidly secured to the outer wall 28 of a hydraulic shock absorber cylinder 30 which extends upwardly through skirt 14 and dome 8 in concentric relation therewith. At its lower end, shock absorber casing 30 is connected to unsprung mass 6 by means of a semi-universal clevis structure 32. Extending upwardly through casing 30 is the usual shock absorber piston rod 34, the upper end of which is upset to form a button head 36. Button head 36 is sandwiched between a pair of annular rubber elements 38 and 40 which are encased in a flanged cup element 42 secured to the lower surface of the upper end wall 44 of dome 8. Dome 8 in turn is connected to sprung mass 4 by a semi-universal clevis structure 46 similar in form to lower clevis structure 32.

In accordance with the present invention, cup element 42 has secured thereto a rigid inverted cup-shaped member 48 in which is disposed an annular elastomeric buffer element 50. Element 50 is so formed so that the outside diameter thereof tightly interfits member 48 while the inside diameter thereof provides a slight clearance relative to piston rod 34. In addition, the inside diameter is formed with a tapered or outwardly flared lead-in 52 at its lower extremity, the purpose of which is shortly to be described. Immediately upwardly adjacent to piston shoulder 24, shock absorber casing 30 has connected thereto a flanged cylindrical collar 54 which surrounds an upwardly extending striker element 56. Element 56 is in the form of an erect cone and terminates in an apertured upper end which closely surrounds piston rod 34.

Under normal vehicle operating conditions, the magnitude of deflection of spring assembly 2 is such that striker 56 travels upwardly and downwardly with shock absorber casing 30 along the axis of piston rod 34 without engaging rubber buffer 50. However, upon the occurrence of excessive compression deflection, striker 56 approaches element 50 and enters the lead-in portion 52. As the degree of compression deflection increases, nose portion 56 progressively deforms rubber element 50 in the manner shown in FIG. 2. Since the striker 56 is conical in cross section as it progressively enters inverted cup member 48, the striker area engaging rubber buffer 50 progressively increases. Therefore, since load is equal to stress of the elastomer times the area of the striker, the degree of taper of the striker will determine the degree of change of the effective spring rate. In practice, the shape of the striker and elastic characteristic of buffer 50 are selected so that the change in effective spring rate, at the transitional point where the striker first engages the bumper 50, is relatively imperceptible.

From the foregoing it will be seen that a novel and improved spring assembly has been provided. The bumper arrangement of the invention not only exhibits considerably improved resistance to shredding or fracturing under repeated impact by striker 56, but in addition the change in rate caused by progressive deformation of elastomer 50 blends more smoothly with the progressive rate increase of the air spring.

While but one embodiment of the invention has been shown and described, it will be apparent that other changes and modifications may be made therein. It is, therefore, to be understood that it is not intended to limit the invention to the embodiment shown, but only by the scope of the claim which follows.

We claim:

A vehicle suspension spring assembly comprising, load supporting elastic means disposed between the sprung and unsprung mass of the vehicle, a hydraulic shock absorber arranged concentrically within said primary elastic means, said shock absorber including a piston rod flexibly connected to the sprung mass and a cylinder articulably connected to the unsprung mass, an annular rubber bumper surrounding said rod, a rigid inverted cup-shaped member surrounding said bumper and secured to said sprung mass, the peripheral wall of said inverted cup-shaped member being cylindrical in form and of uniform diameter from end to end, a conical striker portion on said cylinder engageable with said bumper upon predetermined compression deflection of said primary elastic means, and means forming a tapered mouth on said annular bumper aligned with said striker.

References Cited in the file of this patent

UNITED STATES PATENTS

| | | |
|---|---|---|
| 1,750,510 | Day | Mar. 11, 1930 |
| 2,056,106 | Kuhn | Sept. 29, 1936 |
| 2,879,986 | Maier | Mar. 31, 1959 |
| 2,922,635 | De Lorean | Jan. 26, 1960 |

FOREIGN PATENTS

| | | |
|---|---|---|
| 937,860 | Germany | Jan. 19, 1956 |